(12) United States Patent
Korpi

(10) Patent No.: US 8,991,319 B2
(45) Date of Patent: Mar. 31, 2015

(54) AIRPLANE TRAY CIP

(71) Applicant: Norman Korpi, West Hollywood, CA (US)

(72) Inventor: Norman Korpi, West Hollywood, CA (US)

( * ) Notice: Subject to any disclaimer, the term of this patent is extended or adjusted under 35 U.S.C. 154(b) by 0 days.

(21) Appl. No.: 13/868,020

(22) Filed: Apr. 22, 2013

(65) Prior Publication Data

US 2014/0311388 A1    Oct. 23, 2014

(51) Int. Cl.
   A47B 23/00  (2006.01)
   A47B 23/02  (2006.01)
   A47B 23/04  (2006.01)

(52) U.S. Cl.
   CPC ............... *A47B 23/001* (2013.01); *A47B 23/02* (2013.01); *A47B 23/043* (2013.01)
   USPC ............................................. 108/44; 108/25

(58) Field of Classification Search
   CPC .... A47B 23/002; A47B 23/043; A47B 23/04; A47B 2200/004324; A47B 2200/0043; A47G 23/0608
   USPC .......... 108/43, 44, 6, 9, 25, 26; 248/444, 456, 248/460
   See application file for complete search history.

(56) References Cited

U.S. PATENT DOCUMENTS

| | | | |
|---|---|---|---|
| 35,781 A * | 7/1862 | Ritter | 108/4 |
| 70,339 A * | 10/1867 | Kreitz | 108/9 |
| 103,682 A * | 5/1870 | Sullivan | 248/455 |
| 1,180,057 A * | 4/1916 | McNamara | 248/456 |
| D225,291 S * | 12/1972 | Kastner | D6/484 |
| 4,555,128 A * | 11/1985 | White et al. | 248/456 |
| 4,770,107 A * | 9/1988 | Miller | 108/44 |
| 4,852,498 A * | 8/1989 | Judd | 108/43 |
| D333,390 S * | 2/1993 | McCauley | D6/484 |
| 5,692,815 A * | 12/1997 | Murphy | 108/43 |
| 6,338,302 B1 * | 1/2002 | Montagner | 108/90 |
| 6,353,529 B1 * | 3/2002 | Cies | 248/917 |
| 6,584,913 B2 * | 7/2003 | Cloud | 108/43 |
| D557,267 S * | 12/2007 | Beilstein et al. | D14/451 |
| 7,364,129 B1 * | 4/2008 | Levari, Jr. | 108/6 |
| D573,598 S * | 7/2008 | Chu | D14/447 |
| 7,911,784 B2 * | 3/2011 | Jones | 248/346.03 |
| 7,975,623 B1 * | 7/2011 | Gassick et al. | 108/43 |
| 8,020,829 B1 * | 9/2011 | Tamayori | 248/451 |
| 8,167,131 B1 * | 5/2012 | Anderson | 206/575 |
| D663,546 S * | 7/2012 | Jennings | D6/406.3 |
| D668,482 S * | 10/2012 | Pikkaraine | D6/511 |
| 8,424,464 B2 * | 4/2013 | Korpi | 108/9 |
| 2009/0265050 A1 * | 10/2009 | Burpee | 108/43 |

* cited by examiner

*Primary Examiner* — Jose V Chen
(74) *Attorney, Agent, or Firm* — Edwin P. Tarver, Esq.; Lauson & Tarver LLP

(57) ABSTRACT

A portable workstation includes a top panel having a distal edge and a lower surface. Also included are a bottom panel having a proximal edge and an upper surface, and a middle panel connected by a hinge to the distal edge and to the proximal edge. The middle panel and the bottom panel are spanned by a first folding support. The middle panel and the top panel are spanned by a second folding support, so that the first folding support and the second folding support hold the top panel, the bottom panel, and the middle panel in a predetermined, expanded position.

19 Claims, 19 Drawing Sheets

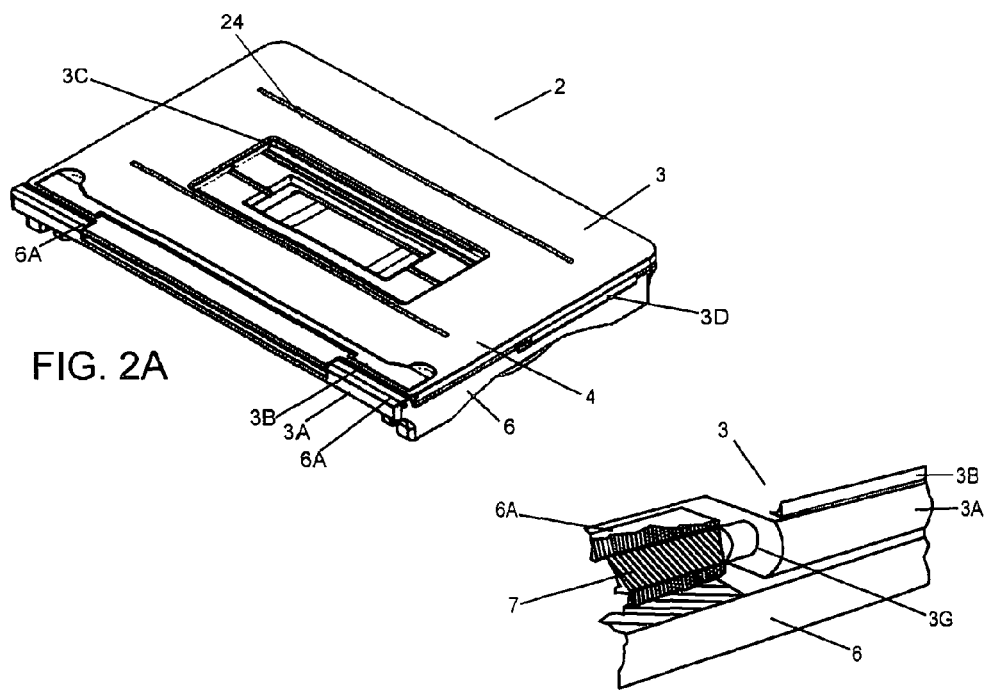
FIG. 2A
FIG. 2B
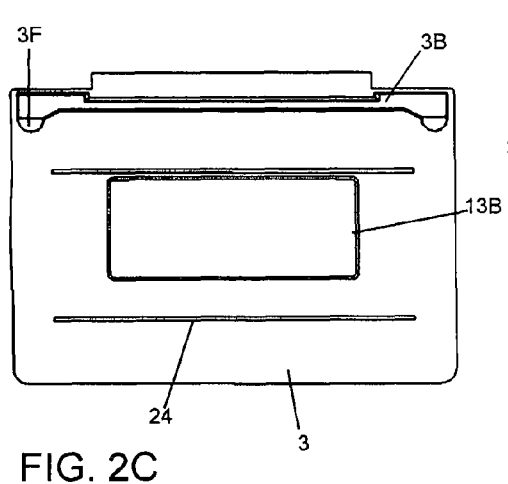
FIG. 2C
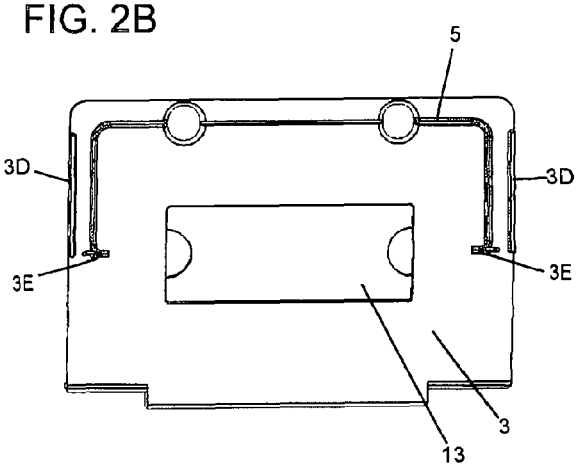
FIG. 2D

AIRPLANE TRAY CIP

CROSS-REFERENCE TO RELATED APPLICATIONS

This application is a continuation-in-part of pending published application no. 2011/0126739, filed on May 23, 2010, which claims the priority benefit of provisional application No. 61/181,801, filed on May 28, 2009.

BACKGROUND

A wide variety of trays, tables and supports exist to hold various different items. For example, some devices currently in the art support laptop computers or DVD players. There are also collapsible portable trays such as bed trays for food service, etc. Travelers on vehicles such as airplanes, trains and buses are typically provided a single tray table within a confined amount of space, and in some case no tray tables are provided.

One aspect of the prior art is that current tray tables provide limited usable space and generally offer no separation for keeping food and beverages away from devices or items that may be damaged, including laptop computers, PDAs, hooks, DVD players, game players or other electronic devices. For example, a typical airplane seatback tray table is approximately 10.5 inches by 16 inches, does not exceed the width of the seat hack, and folds upright along the seat back when not in use. In use, such a tray table typically rests slightly above a traveler's lap and is in close proximity to the user's waist. This position is often too low for effectively using items with screens such as laptops or DVD players and can strain a user's wrists, hands, arms, back, neck, head, and eyes.

A person using a tray table at such a low level must bend their neck to a stressful position, often for long periods of time during flight or travel in order to use or enjoy devices placed on the tray table, which may result in pain or discomfort. Current tray tables often give little or no options with positioning, and the angle of the seat back in front of the traveler can interfere with the use of laptop computers or DVD players.

Conventional airplane tray tables are designed for food and beverage service and general use such as writing or reading a book or magazine. Today, portable electronic devices such as, music players, DVD players, laptops. CD players, and game players are also commonly used. These devices require better use of the available space in a seat. In some instances, laptops and DVD players can consume all of the flat space provided by a tray table, and when food or beverage is served travelers must balance all of these items on one surface where liquids could harm electronic devices.

By way of educational background, another aspect of the prior art is that there are currently notebook stands and devices that support secondary devices such as laptop computers or hooks available that have adjustable angles for viewing, and there are trays and tables that are collapsible and portable that have stands or appendages. However, collapsible tables and trays that exist generally are not within a size requirement that would allow them to operate in connection and conjunction with an airplane seat hack tray or a table in a confined space such as, but not limited to, on an airplane or train.

In view of the foregoing, it is clear that these traditional techniques are not perfect and leave room for more optimal approaches.

SUMMARY

A portable workstation includes a top panel having a distal edge and a lower surface. Also included are a bottom panel having a proximal edge and an upper surface, and a middle panel connected by a hinge to the distal edge and to the proximal edge. The middle panel and the bottom panel are spanned by a first folding support. The middle panel and the top panel are spanned by a second folding support, so that the first folding support and the second folding support hold the top panel, the bottom panel, and the middle panel in a predetermined, expanded position.

The workstation ideally has the first folding support affixed to its lower surface by a hinge. Also, the second folding support is affixed to the middle panel by a hinge. Multiple points of contact may engage the first folding support, and multiple points of contact adapted to engage the second folding support, providing strength and resiliency to the workstation. Preferably, housings will be provided for the first folding support and the second folding support.

In order to hold items on the top panel, the top panel may include a front holding bar, and a back holding bar. Additionally, to provide for holding objects such as a tablet computer in an upright configuration, the top panel may also include a rectilinear holding slot. In any event, for any configuration of holding mechanisms, the top panel will preferably include non-slip surface characteristics such as rubberized strips.

The middle panel includes an opening, and the bottom panel includes a sliding tray adapted to slide through the opening for holding items, including an indented portion and a circular cut-out portion. To hold the workstation firmly in position, the bottom panel should include an attachment mechanism for affixing the lower plate to an airline seatback tray table. In one preferred embodiment, the attachment mechanism includes clips. In other embodiments, the attachment mechanism may include a resilient band.

BRIEF DESCRIPTION OF THE FIGURES

FIG. 1A is a side perspective view of a tray table device mounted to an existing tray table, and FIG. 1B is a side view of multiple users of tray table devices using these devices in various different manners.

FIGS. 2A through 2V illustrate various views of an exemplary tray table device, in accordance with an embodiment of the present invention. FIG. 2A is a side perspective view of the tray table device in a collapsed state. FIG. 2B is a detailed and partially cut-away view of a frame surface panel hinge. FIG. 2C is a diagrammatic top view of a surface panel. FIG. 2D is a diagrammatic bottom view of the surface panel. FIG. 2J is a diagrammatic top view of a frame. FIG. 2K is a diagrammatic bottom view of the frame. FIG. 2L is a side perspective view of a stand appendage and a mounting clip. FIG. 2M is a side perspective view of the bottom of the frame. FIG. 2N is a side perspective view of the tray table device mounted on a tray table. FIG. 2V is an exploded view of the tray table device with an attachable cushion.

FIGS. 18A-18B show an alternative embodiment workstation being incorporated onto a carrying bag.

FIGS. 19A-19I1 show an alternative embodiment workstation being incorporated onto a travel pillow.

REFERENCE NUMBERS

10. Workstation
12. Seat Back
14. Tray Table
16. Drink
18. Laptop Computer
20. First Passenger
22. Second Passenger
24. Third Passenger
26. Fourth Passenger
28. Laptop Screen
30. Pins
32. Arms
34. Tracks
36. Lock
38. Catch
40. Tablet Computer
42. Receptacle
44. Carrying Bag
46. Catch
48. Travel Pillow
50. Tripod
52. Tripod Mount
54. Canvas
100. Top Panel
102. Front Holding Bar
104. Back Holding Bar
106. Holding Slot
108. Rubberized Strips
110. Cut-outs
112. Holding Slot
200. Middle Panel
202. Arm Members
204. Center Member
206. Hollow Space
208. Rubberized Hold
300. Bottom Panel
302. Retractable shelf
304. Handle
306. Soda Can Holder
308. Drink Holder
310. Tabs
312. Shelf Guides
314. Anchoring Clips
316. Slide Guides
318. Feet
320. Mounts
322. Tripod Nut

DESCRIPTION

Figure 1A:
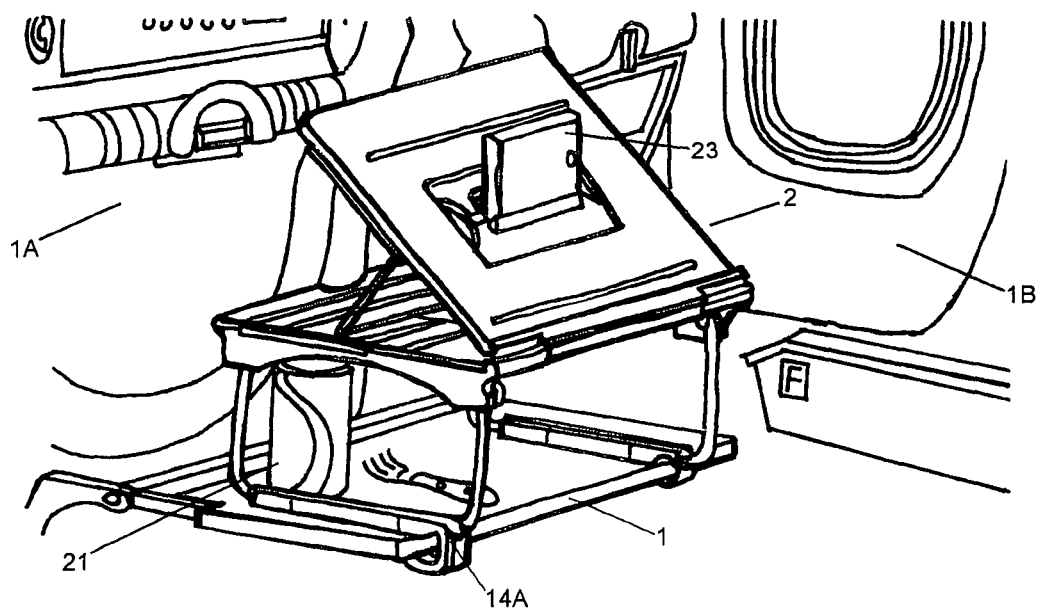
FIGS. 1A and 1B illustrate exemplary tray table devices in use in an airplane, in accordance with an embodiment of the present invention.
Figure 1B:
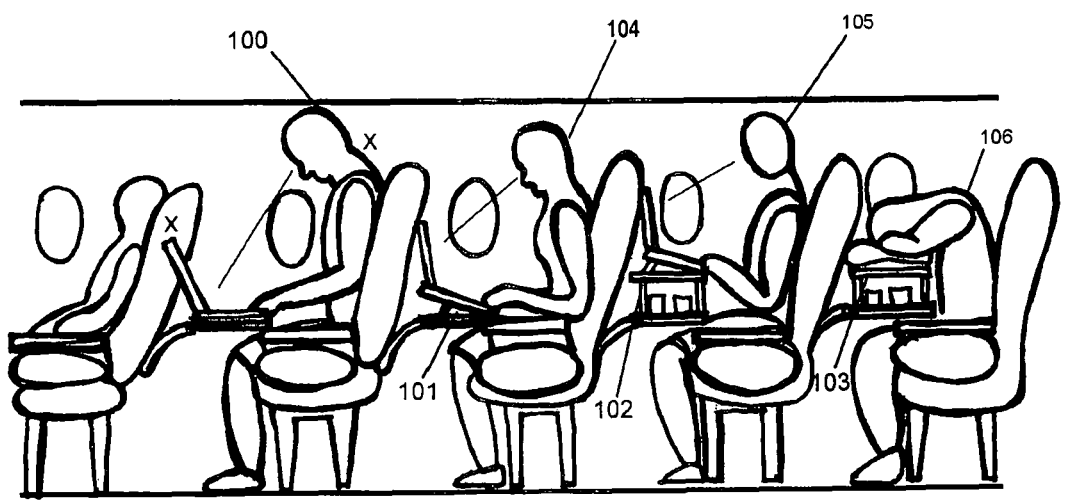

FIGS. 1A and 1B illustrate exemplary tray table devices in use in an airplane, in accordance with an embodiment of the present invention. FIG. 1A is a side perspective view of a tray table device 2 mounted to an existing tray table 1, and FIG. 1B is a side view of multiple users 104, 105 and 106 of tray table devices 101, 102 and 103 using devices 101, 102 and 103 in various different manners. In the present embodiment referring to FIG. 1A, tray table 1 is a compact surface that is collapsible and durable. Tray table 1 is approximately 16.5 inches by 10.5 inches by approximately 1 inch thick, which is a typical size for tray tables of this type, and is attached to a seat back 1A. Fray table device 2 is compact, collapsible, lightweight and durable and may be made of various materials including, without limitation, plastics, rubbers and metals. The dimensions of tray table device 2 preferably range from no greater than 16.5 inches by 10.5 inches to an approximate thickness of one half inch to 1.5 inches. However, tray table devices in alternate embodiments may be larger or smaller. In the present embodiment, tray table device 2 works in conjunction with the limits of space provided by environments such as, but not limited to, an airplane seat back tray table 1, where size is important for tray table device 2 to perform as desired. Tray table 2 preferably does not exceed the width of seat back 1A so that it may function properly. In the present embodiment, tray table device 2 is mounted to tray table 1 by mounting clips 14A.

Figure 2E:
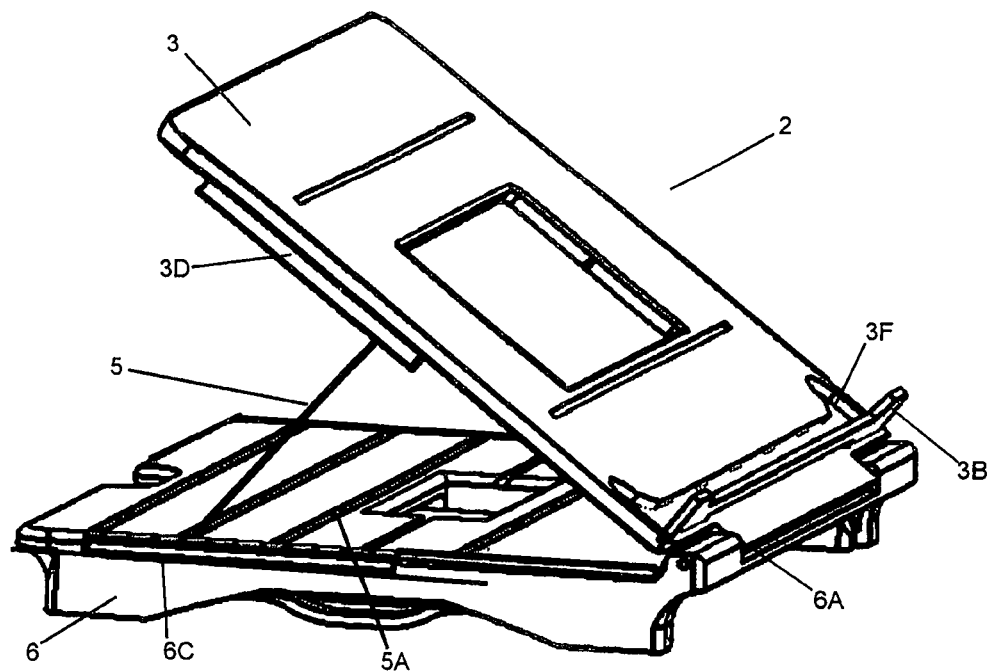
FIG. 2E is a side perspective view of the tray table device in an open state.
Figure 2F:
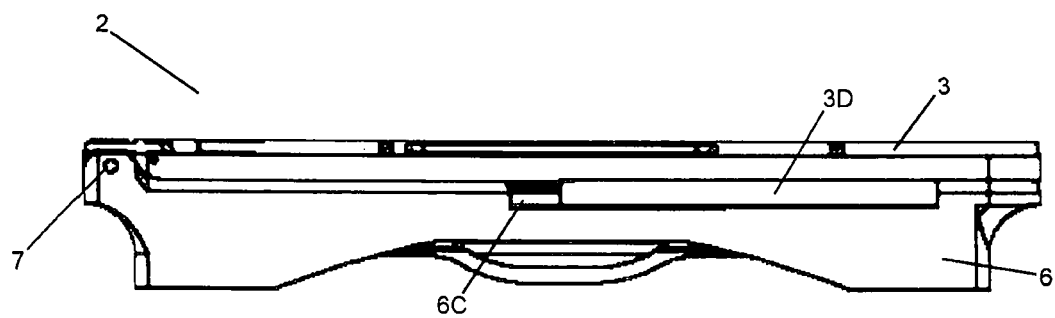
FIG. 2F is a diagrammatic side view of the tray table device.
Figure 2G:
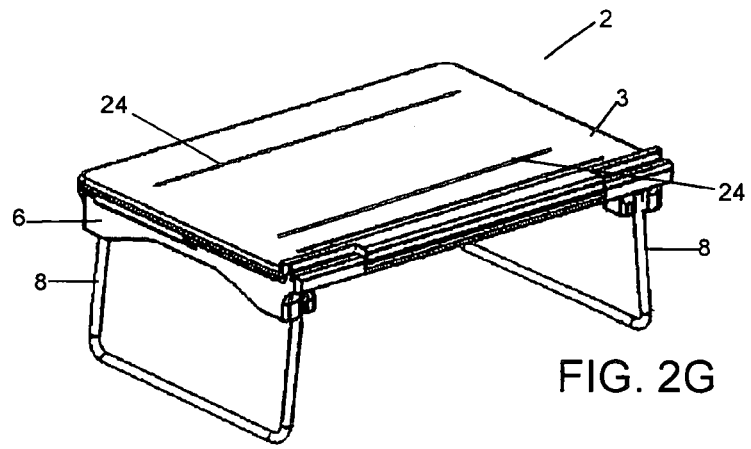
FIG. 2G is a side perspective view of the tray table device with stand appendages extended.
Figure 2H:
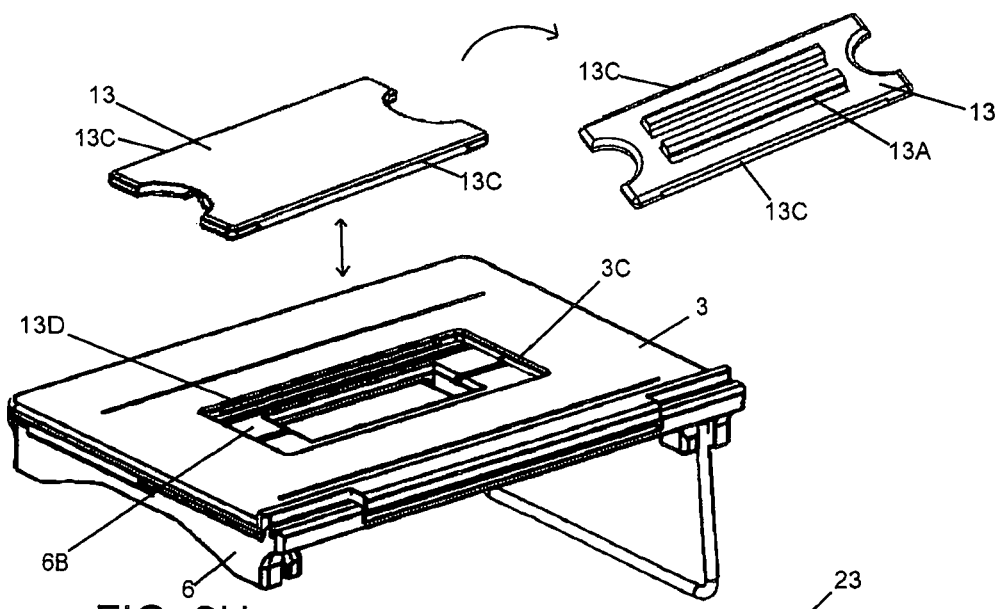
FIG. 2H is a side perspective view of the tray table device with a removable plug removed.
Figure 2I:
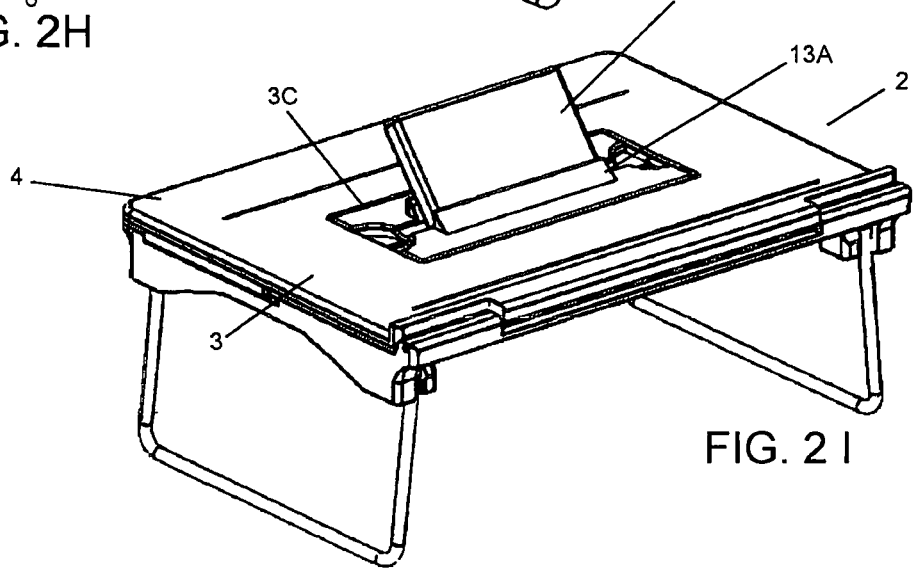
FIG. 2I is a side perspective view of the tray table device with a small electronic device being held by rectilinear lingers.
Figure 2O:
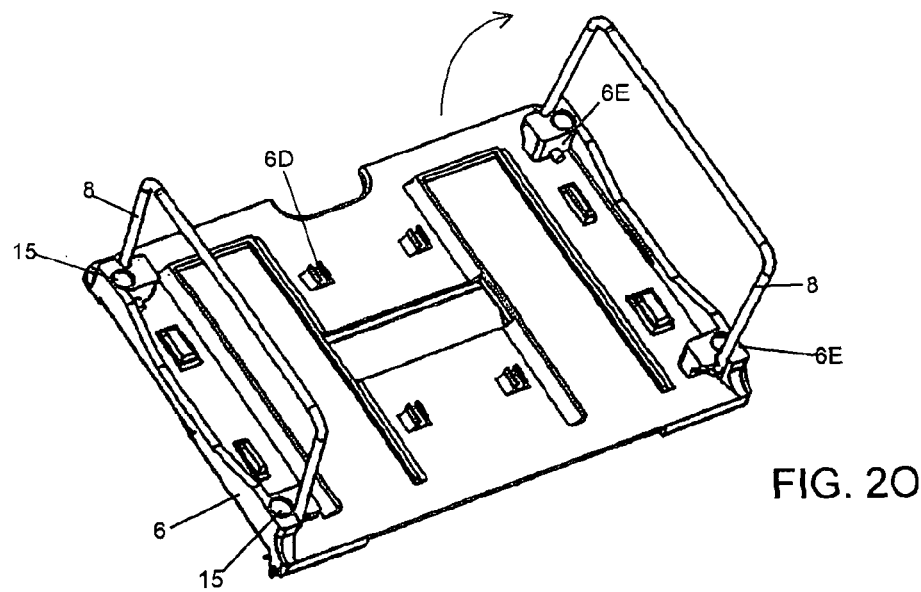
FIG. 2O is a side perspective view of the bottom of the frame with the stand appendages extended.
Figure 2P:
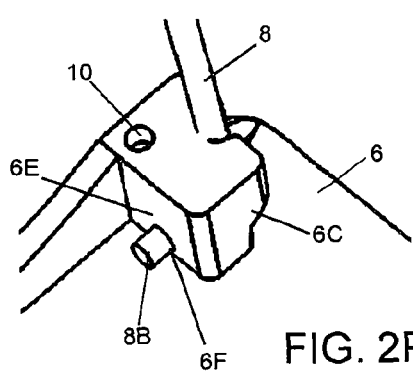
FIG. 2P is a side perspective view of the bottom of a frame stand hinge.
Figure 2Q:
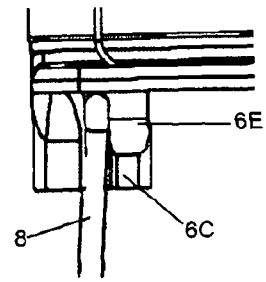
FIG. 2Q is a diagrammatic side view of the frame stand hinge.
Figure 2R:
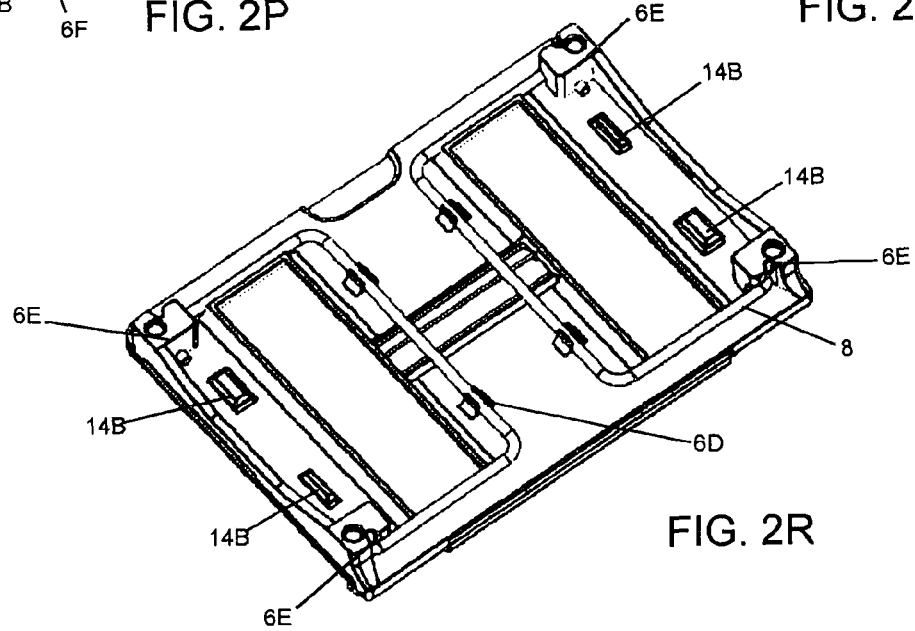
FIG. 2R is a side perspective view of the bottom of the frame with the stand appendages collapsed.
Figure 2S:
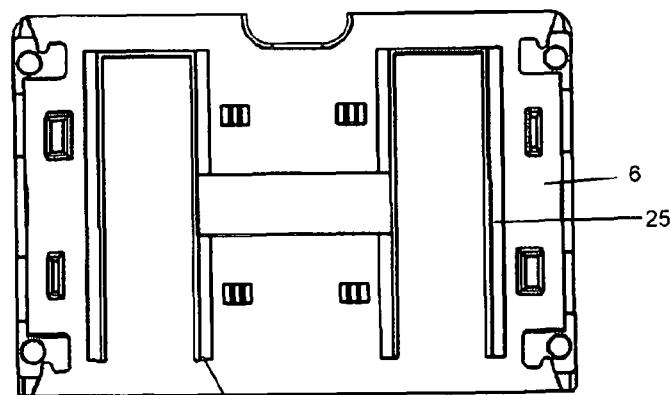
FIG. 2S is a diagrammatic bottom view of the frame with the stand appendages removed.
Figure 2T:
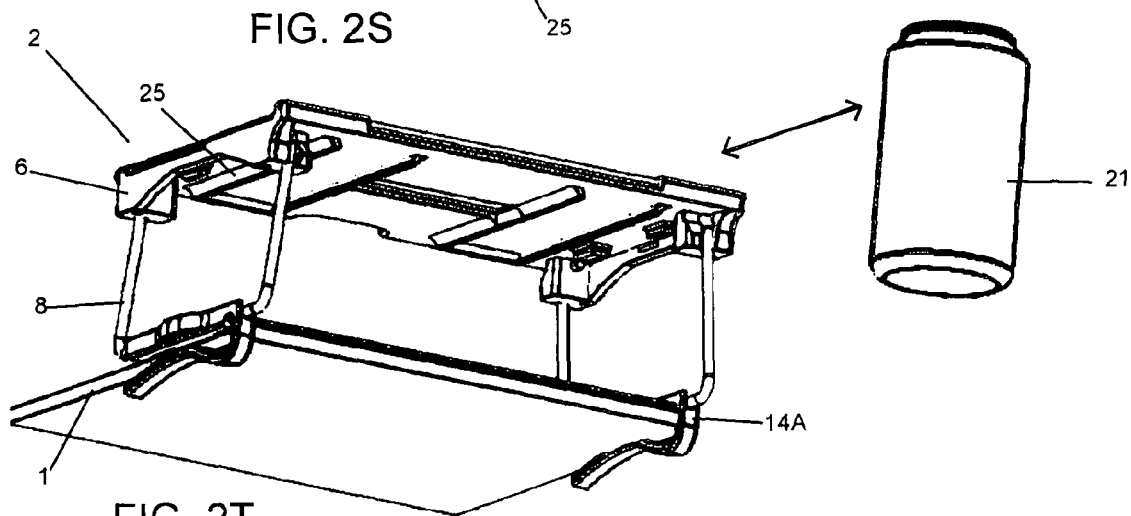
FIG. 2T is a bottom perspective view of the tray table device mounted to the tray table.
Figure 2U:
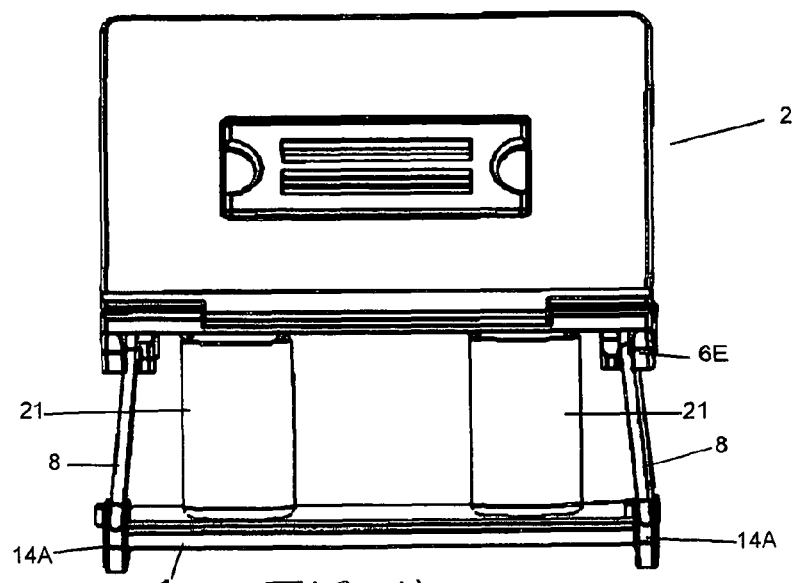
FIG. 2U is a diagrammatic rear view of the tray table device mounted to the tray table.
Figure 2V:
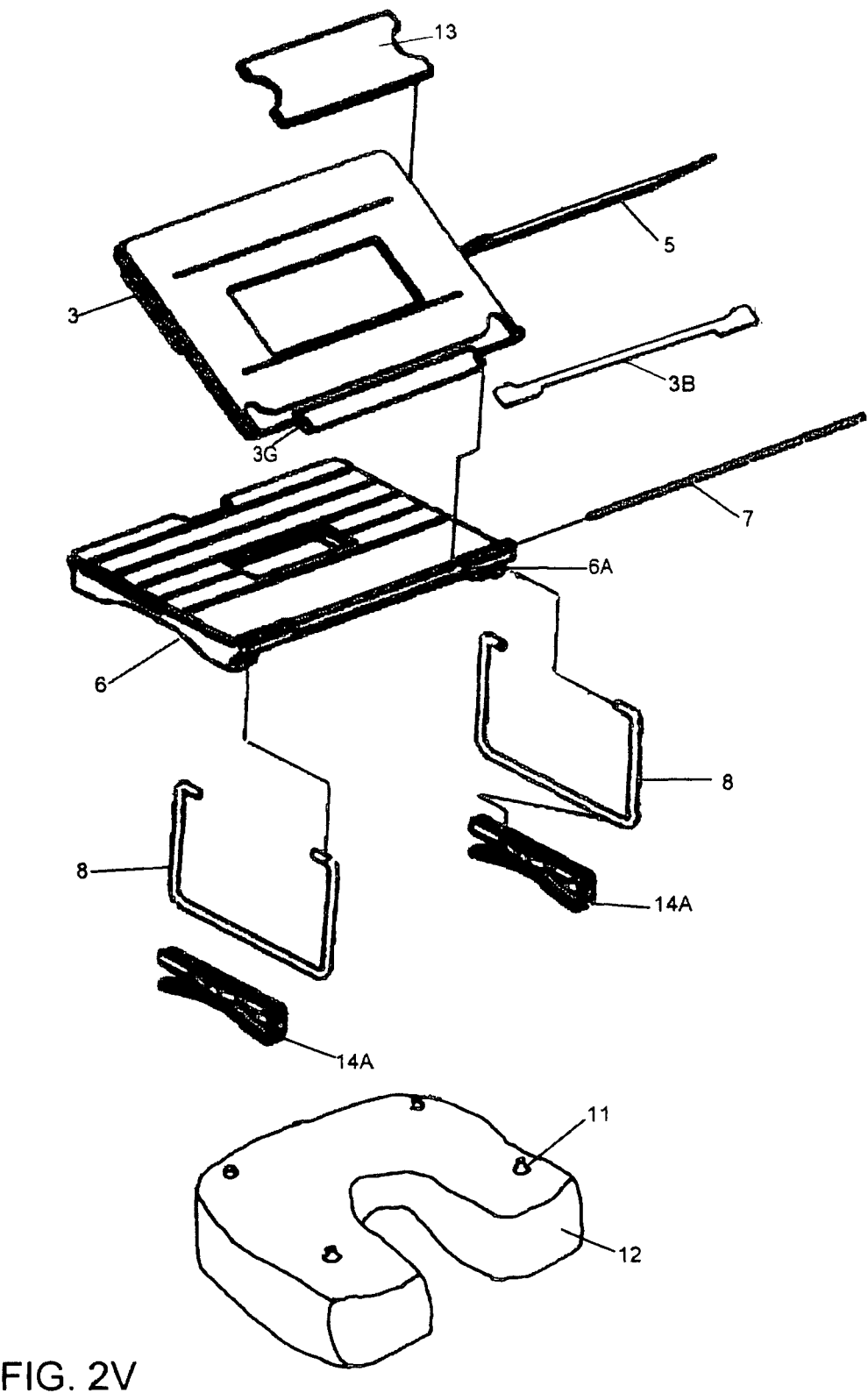

FIGS. 2A through 2V illustrate various views of an exemplary tray table device 2, in accordance with an embodiment of the present invention. FIG. 2A is a side perspective view of tray table device 2 in a collapsed state. FIG. 2B is a detailed and partially cut-away view of a frame surface panel hinge 6A. FIG. 2C is a diagrammatic top view of a surface panel 3. FIG. 2D is a diagrammatic bottom view of surface panel 3. FIG. 2E is a side perspective view of tray table device 2 in an open state. FIG. 2F is a diagrammatic side view of tray table device 2. FIG. 2G is a side perspective view of tray table device 2 with stand appendages 8 extended. FIG. 2H is a side perspective view of tray table device 2 with a removable plug 13 removed. FIG. 2I is a side perspective view of tray table device 2 with a small electronic device 23 being held by rectilinear fingers 13A. FIG. 2J is a diagrammatic top view of a frame 6. FIG. 2K is a diagrammatic bottom view of frame 6. FIG. 2L is a side perspective view of a stand appendage 8 and a mounting clip 14A. FIG. 2M is a side perspective view of the bottom of frame 6. FIG. 2N is a side perspective view of tray table device 2 mounted on a tray table 1. FIG. 2O is a side perspective view of the bottom of frame 6 with stand appendages 8 extended. FIG. 2P is a side perspective view of the bottom of a frame stand hinge 6E. FIG. 2Q is a diagrammatic side view of frame stand hinge 6E. FIG. 2R is a side perspective view of the bottom of frame 6 with stand appendages 8 collapsed. FIG. 2S is a diagrammatic bottom view of frame 6 with stand appendages 8 removed. FIG. 2T is a bottom perspective view of tray table device 2 mounted to tray table 1. FIG. 2U is a diagrammatic rear view of tray table device 2 mounted to tray table 1, and FIG. 2V is an exploded view of tray table device 2 with an attachable cushion 12.

Figure 3:
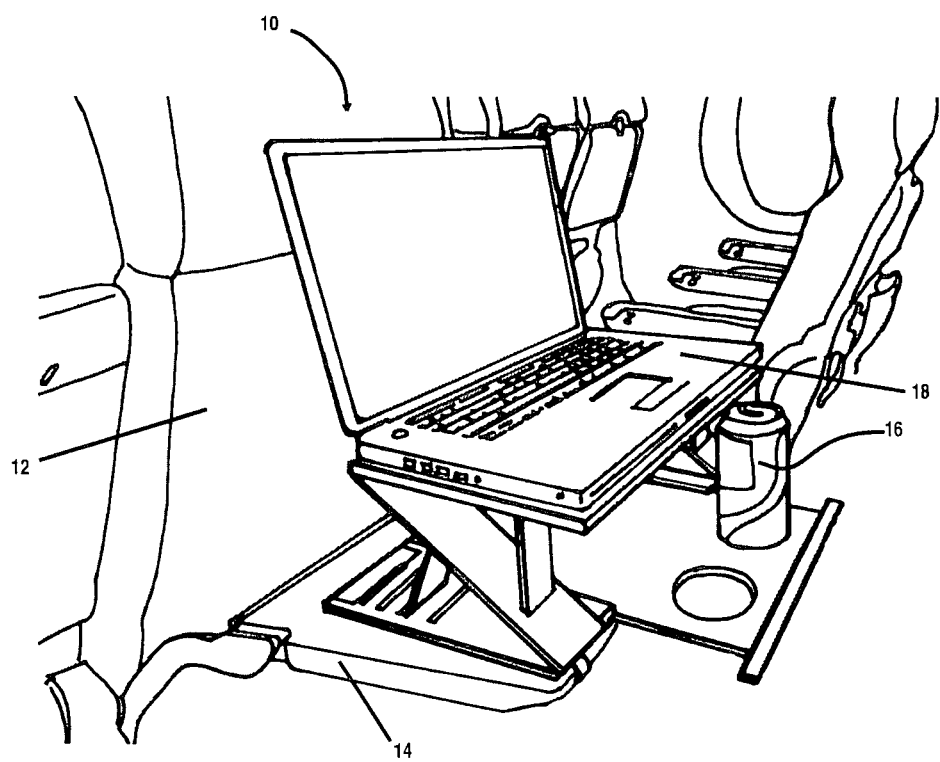
FIG. 3 is a perspective view of an alternative embodiment adjustable workstation.

Referring to FIG. 3, an alternative embodiment of an adjustable workstation 10 (hereinafter referred to simply as a "workstation"), is shown in use on an airplane seatback 12 tray table 14. The workstation 10 is adapted to removably affix to the tray table 14 to provide multiple surfaces to create room for objects commonly used in flight, such as a drink 16, snacks (not shown) and a laptop computer 18, which normally will not fit together on a conventional airplane tray table at once.

Figure 4:
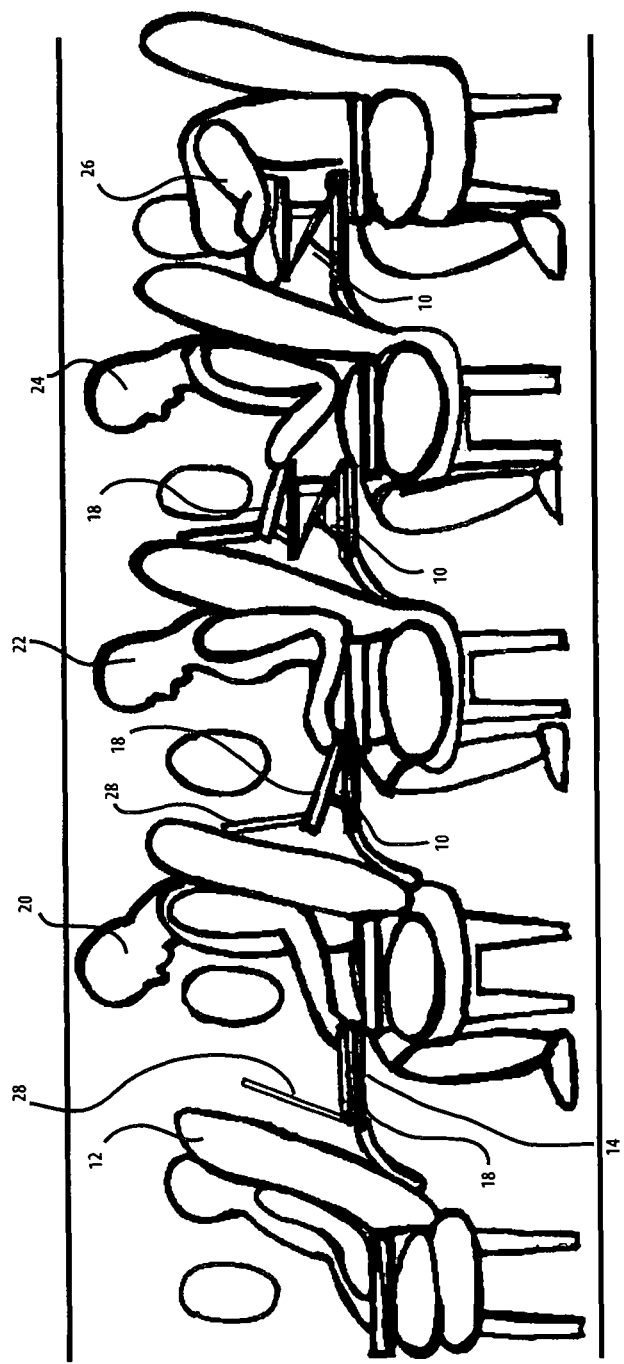
FIG. 4 is a side view of a variety of alternative embodiment workstations in use aboard an airplane.

Referring to FIG. 4, workstations 10 are shown in use aboard an airplane. The first passenger 20 is shown attempting to use a laptop computer 18 on an existing tray table 14. In this configuration, the laptop screen 28 impacts the seatback 12 from which the tray table 14 extends. This tends to put the laptop screen 28 at an angle unsuitable for both viewing and typing. The laptop Computer 18 also takes up all of the room on the tray table 14.

Still referring to FIG. 4, the second passenger 22 is using a workstation 10 to dispose the laptop 18 such that the laptop screen 28 is at the proper angle. The third passenger 24 has the workstation 10 adjusted to dispose the laptop 18 above the tray table 14. Which creates extra room for additional items under the laptop 18. The fourth passenger 26 has positioned the workstation 10 adjusted to provide a resting surface, while also creating room for additional items.

Figure 5:
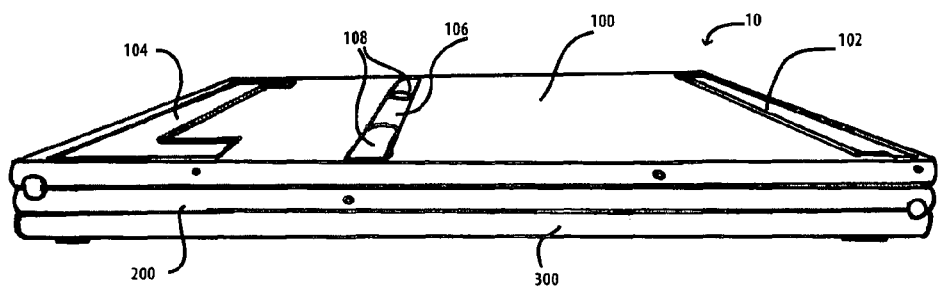
FIG. 5 is a perspective side view of an alternative embodiment workstation.
Figure 6:
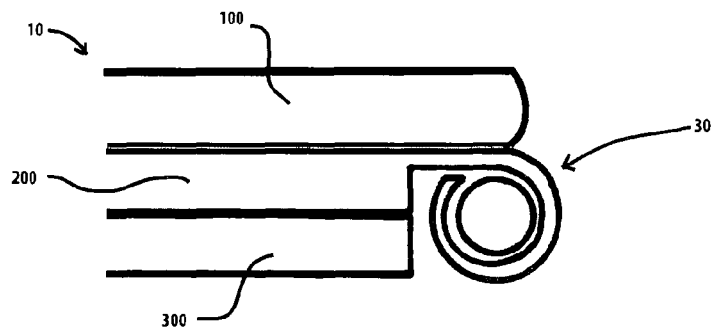
FIG. 6 is a side view of an alternative hinging arrangement.
Figure 7:
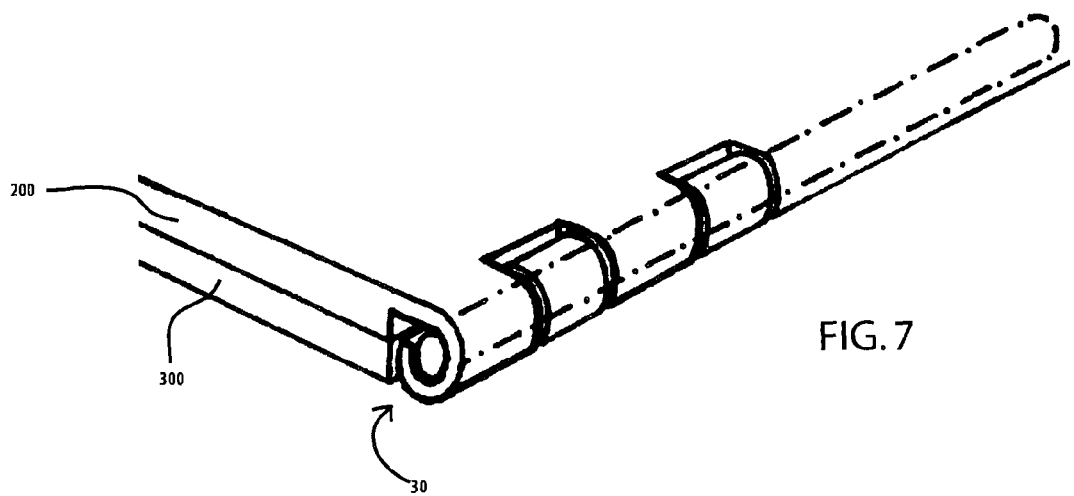
FIG. 7 is a perspective view of an alternative hinging arrangement

Referring to FIG. 5, the workstation 10 comprises three panels, a top panel 100, a middle panel 200, and a bottom panel 300. The top panel 100, middle panel 200 and bottom panel 300 are hingedly connected, in a manner such that the top panel 100 and bottom panel 300 are connected to opposite sides of the middle panel 200. In the illustrated embodiment hinge pins 30 are used to create a hinged connection. Referring to FIGS. 6 and 7 alternative hinging arrangements are shown. In any event, various hinged arrangements, for instance barrel hinges, butterfly hinges, or even living hinges may be used depending on desired characteristics. In one preferred embodiment, the workstation 10 is approximately 16.5 inches by 10.5 inches to fit on a conventional tray table (not shown)

Figure 8:
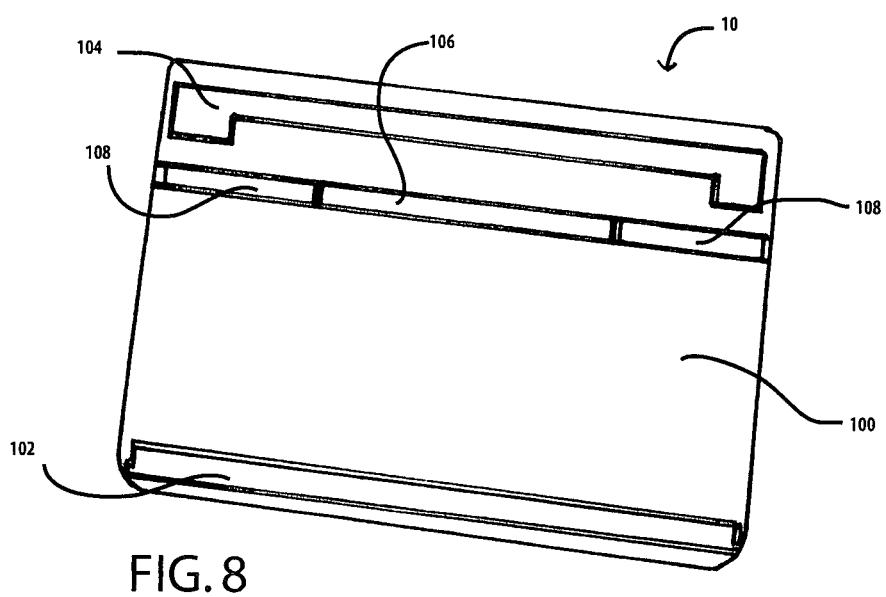
FIG. 8 is a perspective top view of an alternative embodiment workstation

Referring to FIG. 8, the top panel 100 of the workstation 10 includes features useful for holding objects, such as a laptop computer (not shown) on the workstation 10. Among other features, the top panel 100 may include a front holding bar 102 for preventing items from slipping off the top panel 100 when disposed at an angle. A back holding bar 104 may also be incorporated on the opposite side of the top panel 100. In addition to the front holding bar 102 and back holding bar 104, the top panel 100 may incorporate a holding slot 106 for holding objects such as tablet computer (not shown), and include rubberized strips 108 for preventing slippage.

Figure 9:
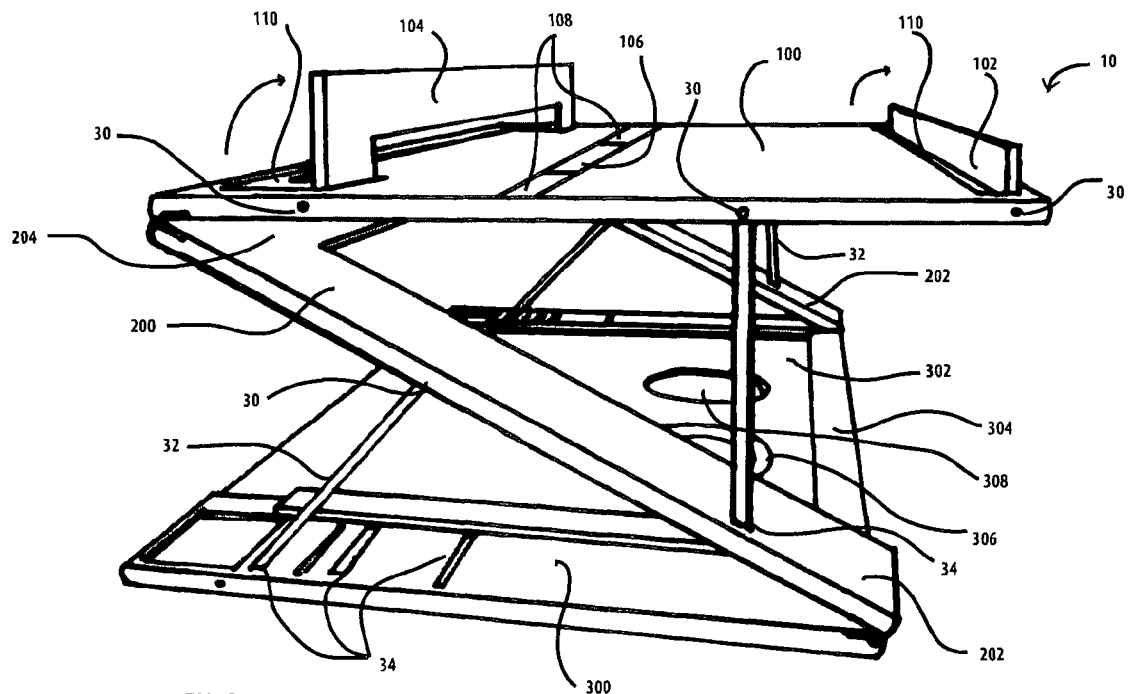
FIG. 9 is a perspective view of an alternative embodiment workstation in an expanded configuration.

Referring to FIG. 9, the workstation 10 is shown in expanded for use. The top panel 100 is shown with the front holding bar 102 and back holding bar 104 in a raised configuration. The top panel 100 is designed with cut-outs 110, which allow the front holding bar 102 and back holding bar 104 to rest flush with the top panel 100 when not in use. In order to raise the front holding bar 102 and back holding bar 104, pins 30 may be used to create an articulating arrangement.

Still referring to FIG. 9, the middle panel 200 is generally horseshoe shaped, including two arm members 202 extending from the top panel 100 to the bottom panel 300, and a center member 204 connecting the two arm members 202 and connecting the middle panel 200 to the top panel 100. The ends of the arm members 202 opposite the center member 204 connect the middle panel 200 to the bottom panel 300. The bottom panel 300 includes a retractable shelf 302, which a user may pull out, thereby creating more space. In a preferred embodiment, the retractable shelf 302 may include a handle 304, a ring-like soda can holder 306, and a conventional drink holder 308, which may be a hollow circle, thereby allowing a drink cup (not shown) to depend from the underside of the retractable shelf 302. The bottom panel 300 may also include tracks 310 for adjusting the position of the workstation 10.

Still referring to FIG. 9, the workstation 10 is adjusted and positioned by a series of arms 32, which extend between the top panel 100 and the middle panel 200, and between the middle panel 200 and the bottom panel 300. The arms 32 between the top panel 100 and the middle panel 200 articulate from hinge pins 30 in the top panel 100, allowing the arms 32 to swing downward and engage tracks 206 in the middle panel 200. When not in use the arms 32 between the top panel 100 and the middle panel 200 may be articulated into housings (not shown) on the underside of the top panel 100 making them flush with the top panel 100 for storage, and to allow the top panel 100 to rest flat against the middle panel 200.

Still referring to FIG. 9, in addition to the arms 32 between the top panel 100 and middle panel 200, folding supports or arms 32 are also disposed between the middle panel 200 and bottom panel 300. Like the arms 32 between the top panel 100 and middle panel 200, the arms between the middle panel 200 and bottom panel 300 are hinged, preferably by pins 30 to the middle panel 200 such that they may be articulated downward to engage tracks 34 on the bottom panel 300. Because the position of the middle panel 200 has a large effect on the overall position of the top of the workstation 10, it is anticipated that multiple tracks 34 will be located on the bottom panel 30 to create a variety of positions.

Figure 10:
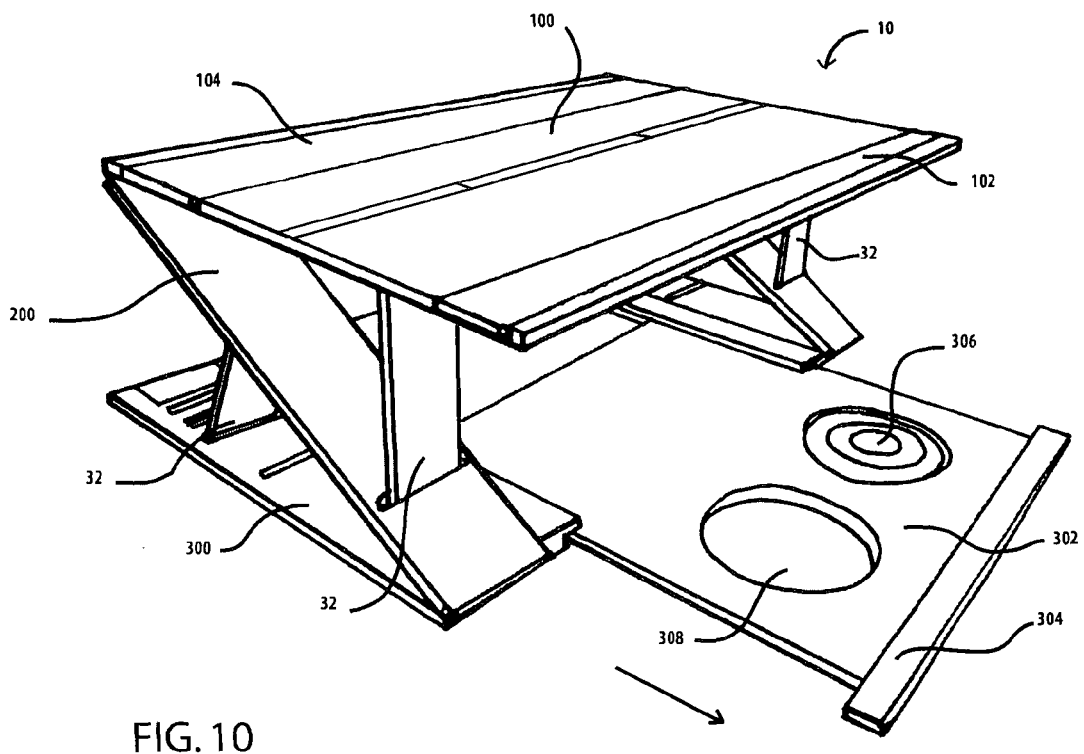
FIG. 10 is a perspective view of an alternative embodiment workstation with a tray extended.

Still referring to FIG. 9, in some instances, it may be desirable to have a very slight angle to the top panel 100. Since the arms 32 depending from the middle panel 200 place the top panel 100 at a more extreme angle, the bottom panel 300 may also include articulating tabs 310. Like the arms 32, the tabs 310 are preferably disposed in the bottom panel 300 when not in use, and articulate into position by pins 30. The tabs 310 may also engage tracks 34 located on the underside of the middle panel 200. FIG. 10 shows the workstation 10 with the retractable shelf 302 extended. In one embodiment, the retractable shelf 302 may be guided by shelf guides 312 incorporated into the bottom member 300.

Figure 11:
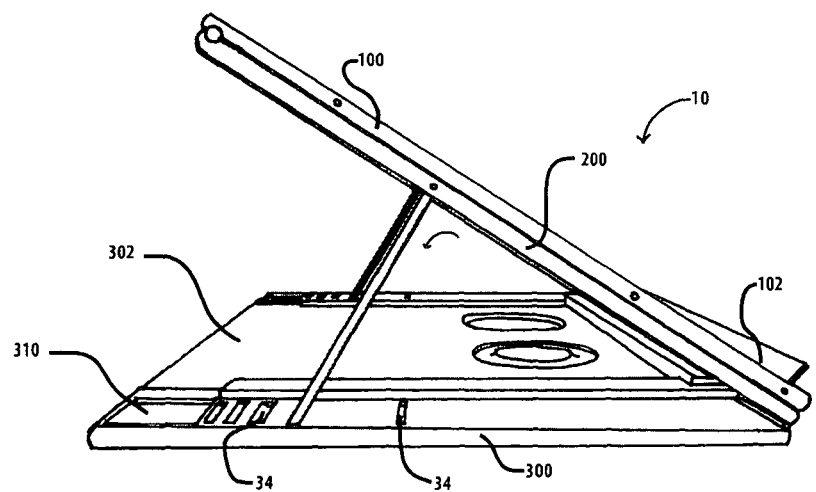
FIG. 11 is a perspective view of an alternative embodiment workstation in a partially collapsed configuration.

FIG. 11 shows the workstation 10 set up in an alternate configuration, where creating an additional work surface is not necessary, but where an angled work surface is preferred. In this illustration, the top panel 100 and middle panel 200 have been angled relative to the bottom panel 300 to create a slanted surface, such as for reading. In order to prevent objects on the top panel 100 from sliding therefrom, the front holding bar 102 has been articulated into a holding position. The arms 32 depending from the middle panel 200 are shown engaging the preferred tracks 34 on the bottom panel 300, thereby preserving the angle of the top panel 100 and middle panel 200.

Figure 12:
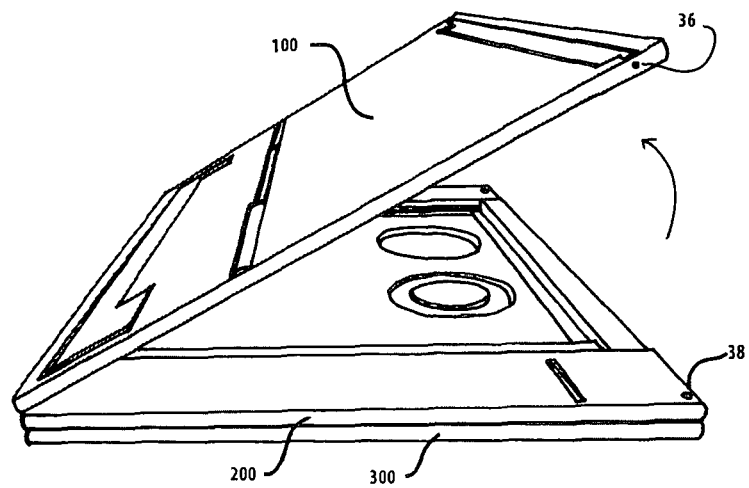
FIG. 12 is a perspective view of an alternative embodiment workstation in a partially opened configuration.
Figure 13:
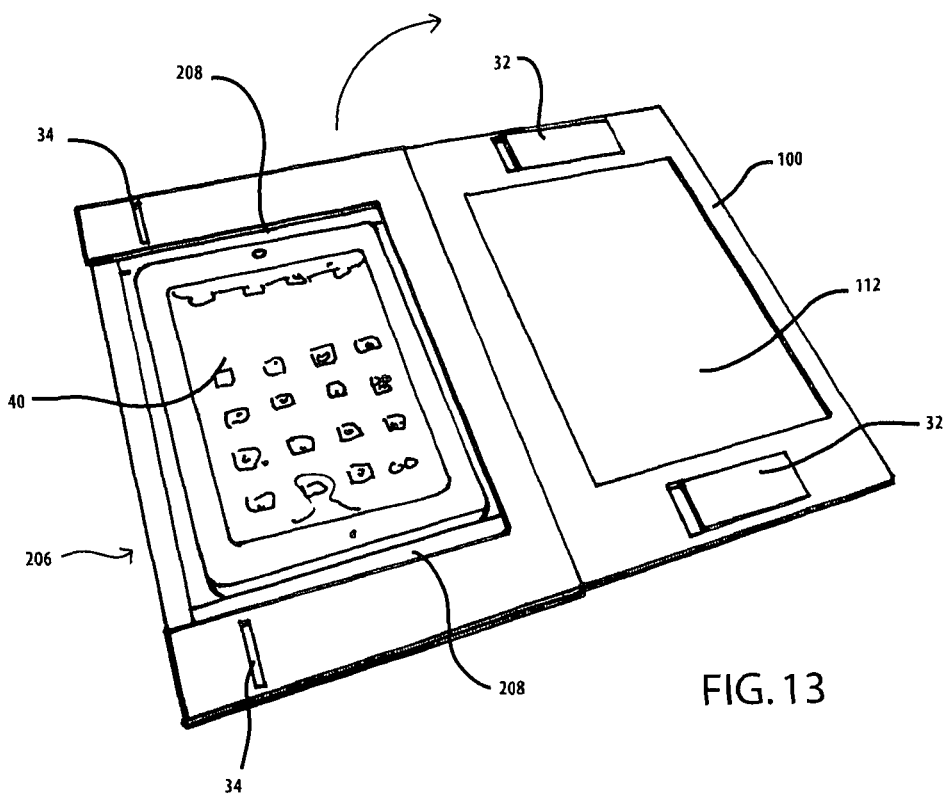
FIG. 13 is a perspective view of an alternative embodiment workstation adapted for holding a tablet computer.

FIGS. 12 and 13 show the workstation 10 in another configuration. In this view a lock 36 on the underside of the top panel 100 fits into a catch 38 on the middle panel. The lock 36 may be coated with flexible material such as rubber, enabling the material to expand and hold the top panel 100 tight against middle panel 200. Ideally, manual pressure can separate and join the lock 36 and catch 38. A user may then adjust the supporting arms 32 to hold the top panel 100 at a preferred angle. FIG. 13 illustrates how a hollow space 206 in the middle panel 200 can be used for storage. In the illustrated example a tablet computer 40 is shown resting in the hollow space 206. In one embodiment, the top panel 100 may have a complimentary holding slot 112 to provide more room for storage. In order to hold an object securely, the middle panel 200 may also have a rubberized hold 208 to prevent slippage.

Figure 14:
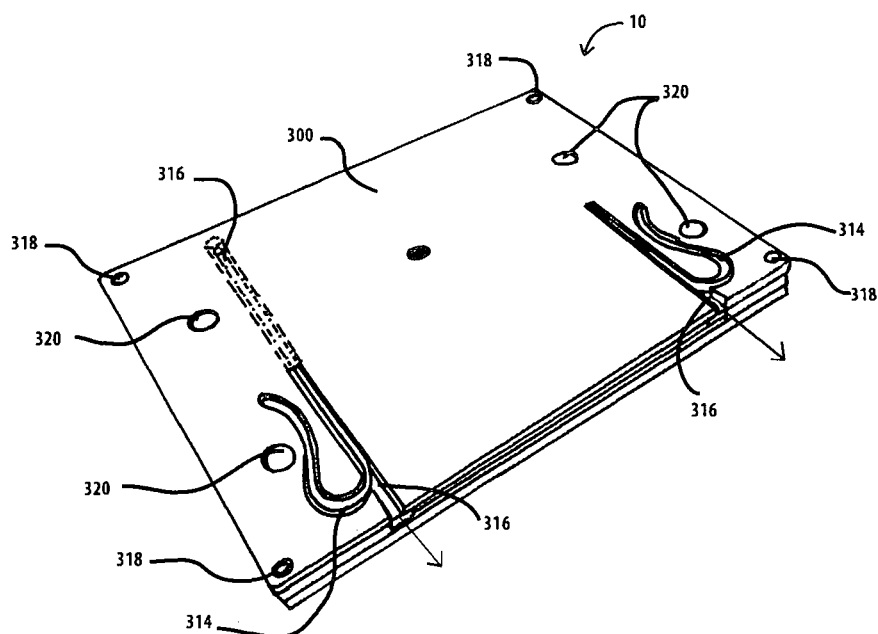
FIG. 14 is a perspective view of the underside of an alternative embodiment workstation including an anchoring mechanism.
Figure 15:
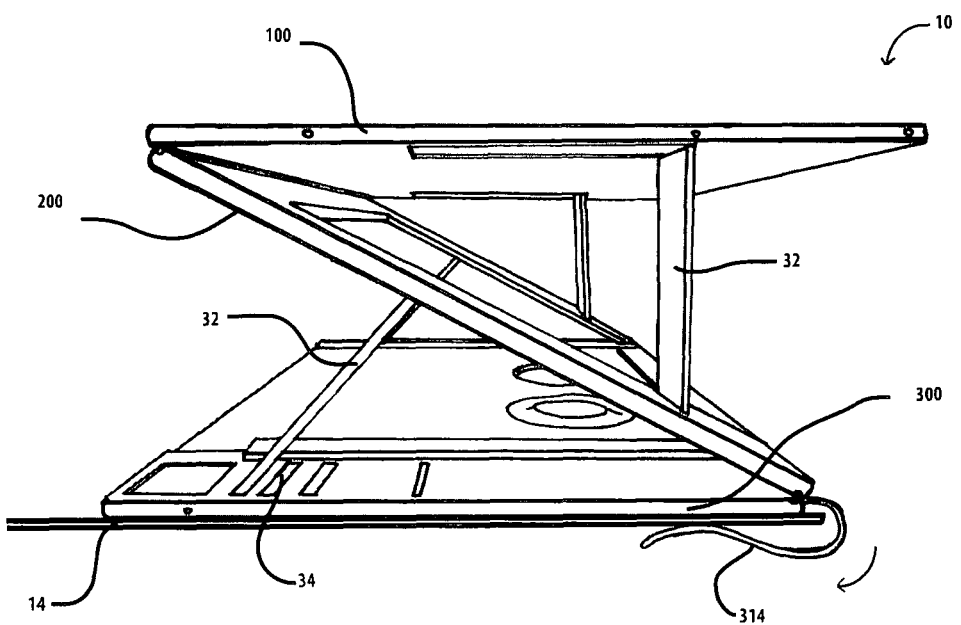
FIG. 15 is a perspective view of an alternative embodiment workstation affixed to a seatback tray table.

FIG. 14 shows the underside of the workstation 10, including a mechanism for holding the workstation 10 on a surface. In the illustrated embodiment, anchoring clips 314 are inserted along slide guides 316 where they are held in place. The sliding nature of the anchoring clips 314 enables them to be easily removed from the slide guides 316 when not needed. Also shown in FIG. 14 are feet 318, preferably rubber feet 318, for preventing the workstation 10 from sliding on a surface. Also shown are mounts 320, for affixing the workstation 10 to a surface. FIG. 15 shows the workstation 10 mounted on a tray table 14. In this view, the workstation 10 is mounted such that the anchoring clips 314 slide over the forward portion of the tray table 14. In alternate embodiments, the clips or another mounting mechanism may engage the sides or bottom of the tray table 14.

Figure 16:
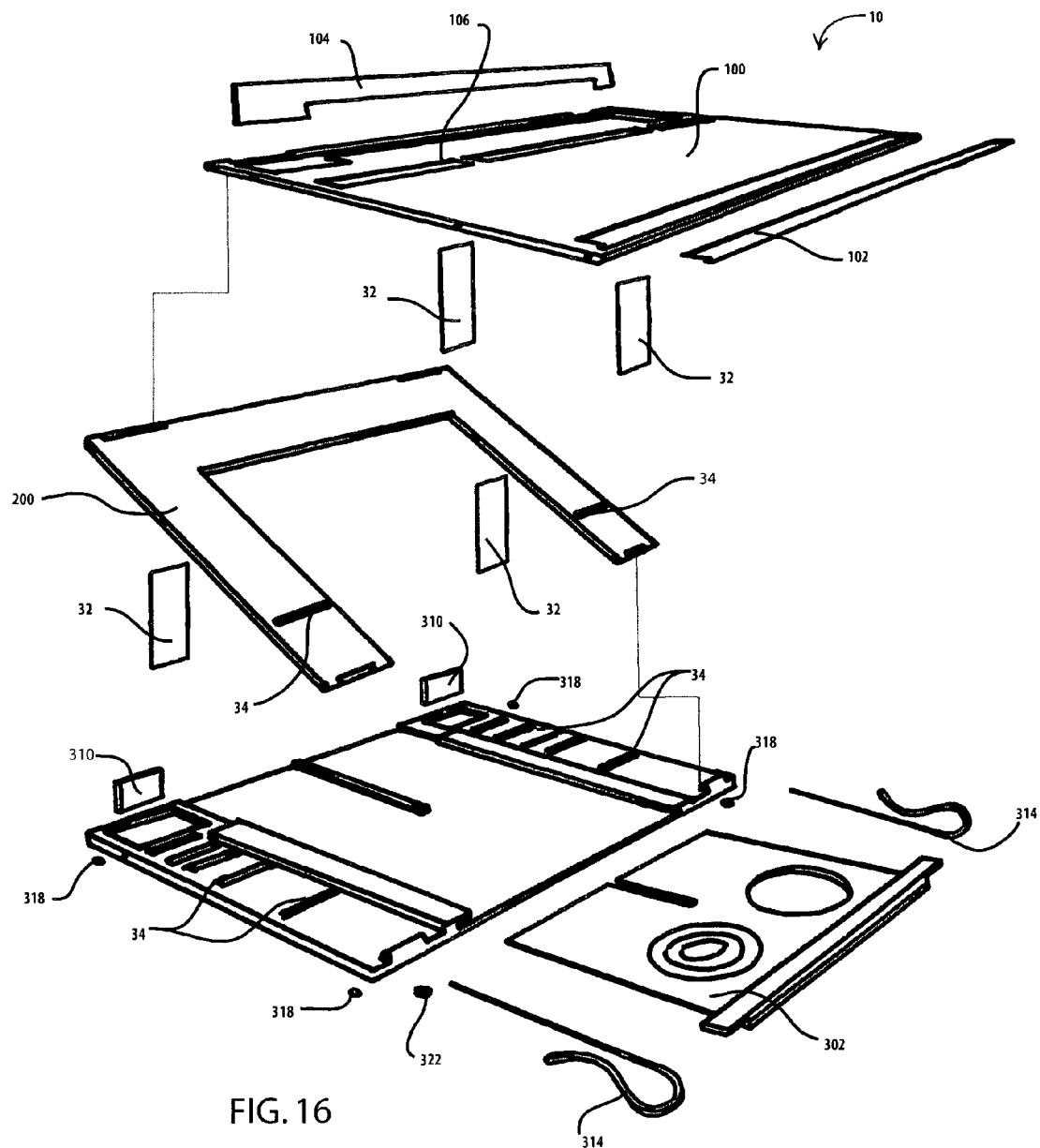
FIG. 16 is an exploded view of an alternative embodiment workstation.

FIG. 16 is an exploded view of the workstation 10. In this view, another mounting mechanism is shown in the form of a standard tripod nut 322.

Figure 17A:
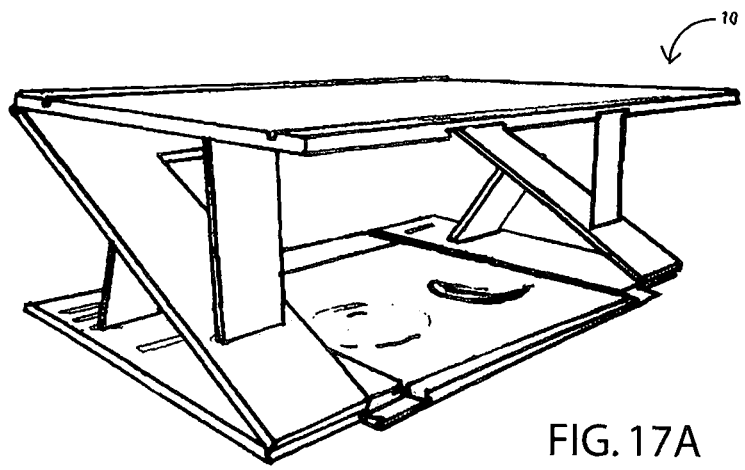
FIGS. 17A-17C show an alternative embodiment workstation being incorporated into a tray table.
Figure 17B:
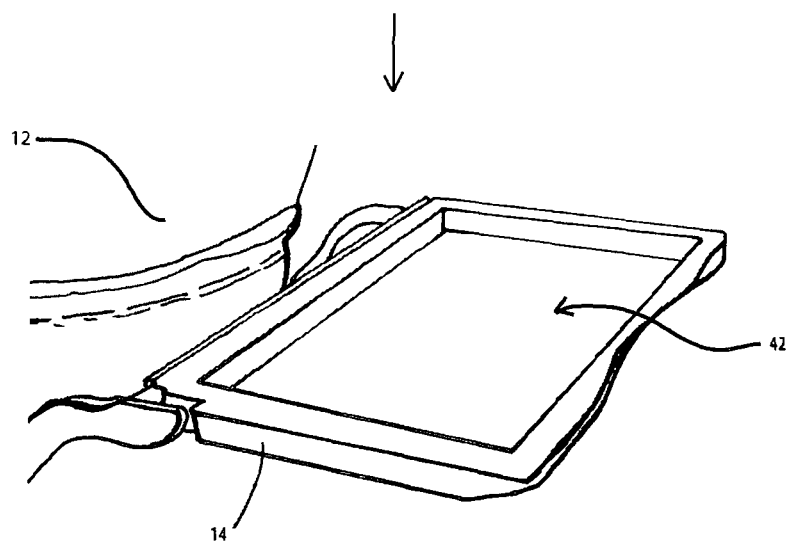
Figure 17C:
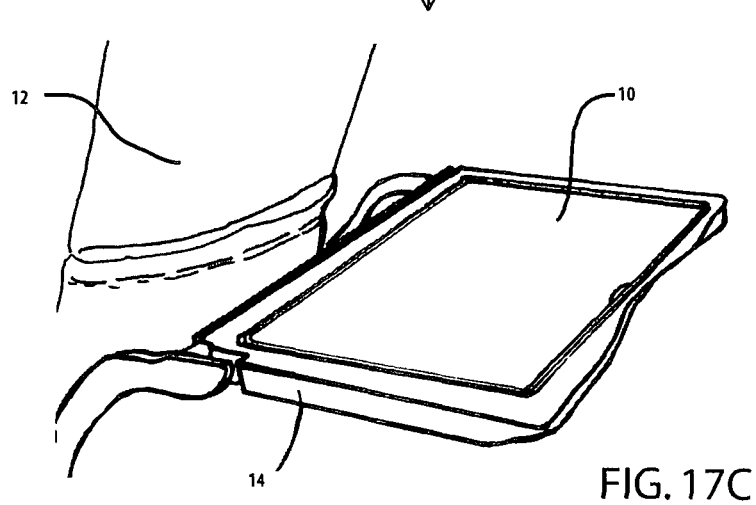

FIGS. 17A-17C show how the workstation 10 may be incorporated into a tray table having an indented area. In FIG. 17A, the workstation 10 is shown in its expanded configuration and ready for use. FIG. 17B shows a modified seatback 12 tray table 14, having a receptacle 42 designed for holding the workstation 10 or a similar flat object. FIG. 17C shows the workstation 10 collapsed and installed in the receptacle 42. In this manner, the workstation 10 can be easily collapsed when meals or other objects are placed on the tray table 14. Ideally, the workstation 10 will be of a thickness relative to the receptacle 42 to present a uniform surface as shown in FIG. 17C.

FIGS. 18A-18B show the workstation 10 as designed to be incorporated onto a carrying bag 44. FIG. 18A shows the workstation 10 prepared for installation on a carrying bag 44 having catches 46 installed on the exterior of the carrying bag 44. It is anticipated in one embodiment that the catches 46 will engage the mounts 320 (not shown) on the bottom panel 300 (not shown), allowing the top panel 100 to be exposed to view. FIG. 18B shows the workstation installed on a carrying bag.

Figure 19A:
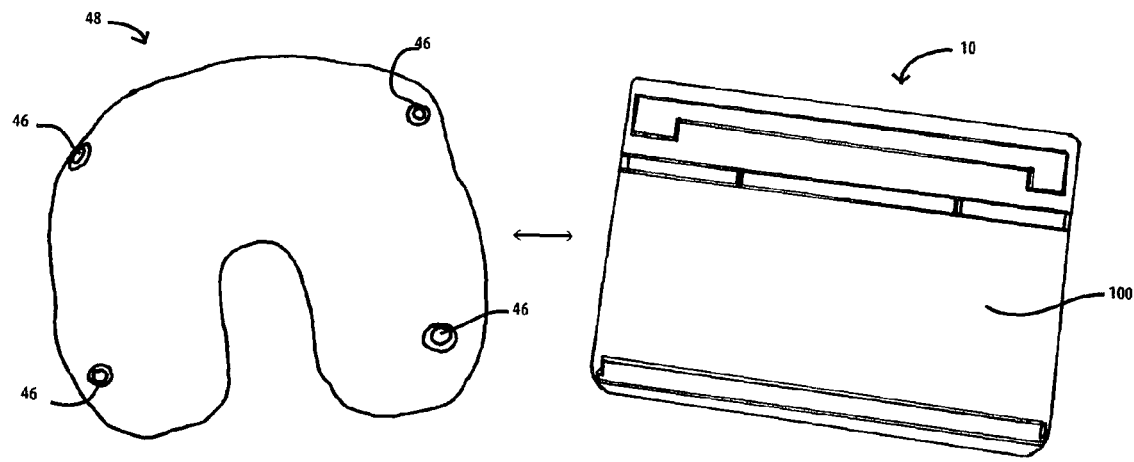
Figure 19B:
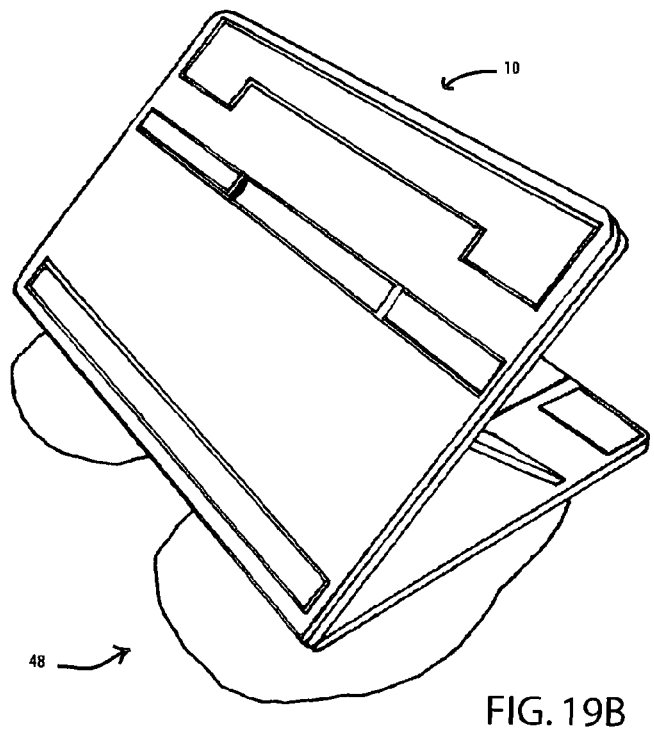

FIGS. 19A-19B show the workstation 10 as designed to be incorporated onto a travel pillow 48. FIG. 19A shows the workstation 10 prepared for installation on a travel pillow 48. Like the carrying bag 44 (not shown), the travel pillow 48 includes catches 46 installed on one side for attaching to the workstation 10. FIG. 1913 shows the workstation 10 attached to the travel pillow 48. In this illustration, the workstation 10 is in use, with the top panel 100 and middle panel 200 raised relative to the bottom panel 300 with arms 32 for support. In this configuration, the travel pillow 48 provides a soft surface for resting the workstation 10 on a person's lap (not shown).

Figure 20A:
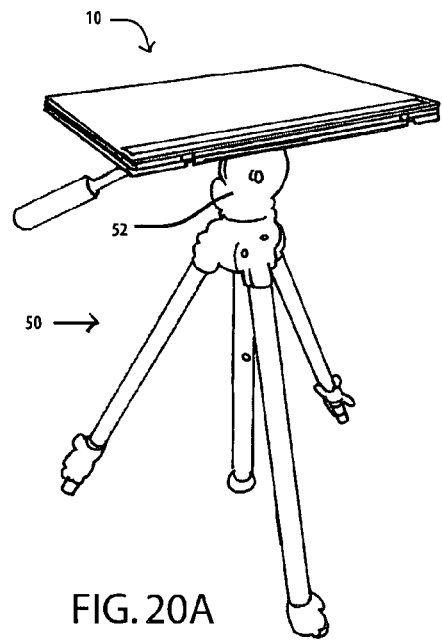
FIGS. 20A-20C show an alternative embodiment workstation incorporated on a tripod.
Figure 20B:
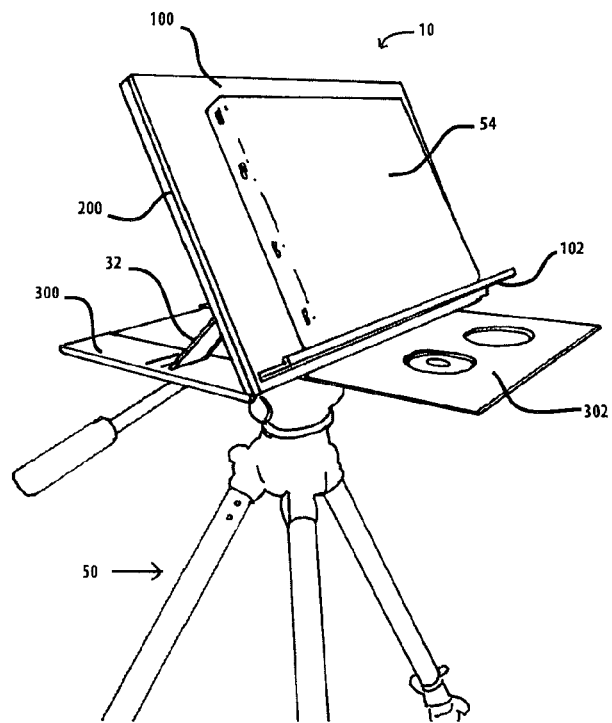
Figure 20C:
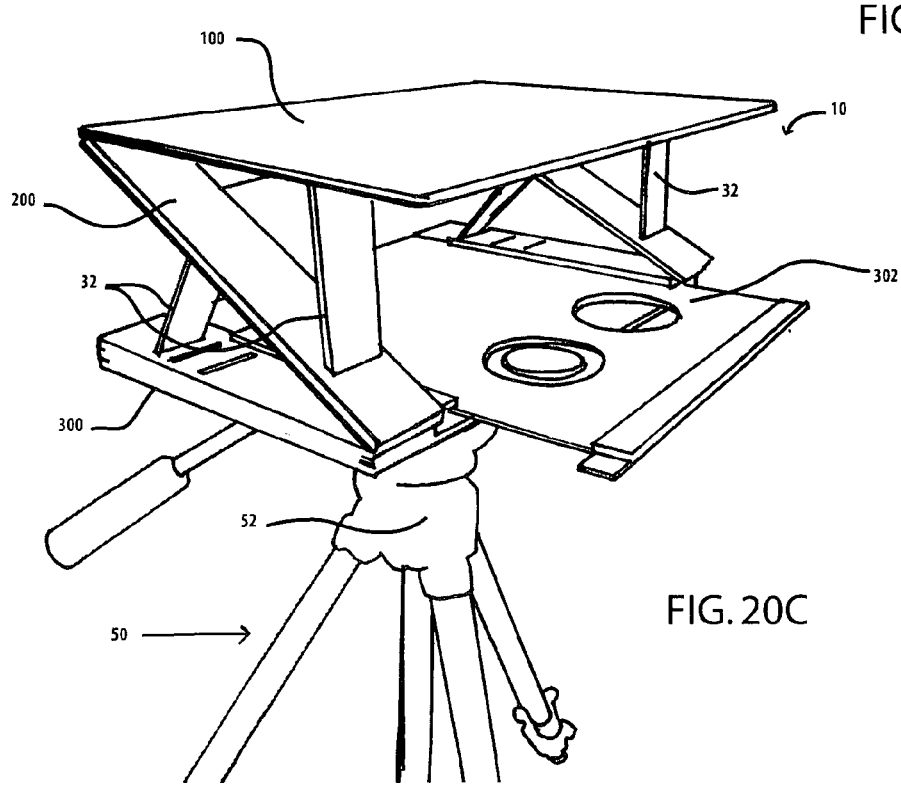

FIGS. 20A-20C show the workstation 10 affixed to a tripod 50. FIG. 20A shows the workstation 10 attached to the tripod mount using the tripod nut 322 (not shown), allowing the workstation to be tilted into at any preferred angle, including flat, as shown, enabling the workstation 10 to function as a table. FIG. 2013 shows the workstation 10 and tripod 50 functioning as an easel. By raising the top panel 100 and middle panel 200 relative to the bottom panel 300 with arms 32 for support, the workstation provides a slanted surface with which to hold a canvas 54. The canvas 54 is held in place by the front holding bar 102. Also in this view, the retractable shell 302 is extended for holding an object such as a palette (not shown). FIG. 20C shows the workstation 10 affixed to a tripod 50 and extended to create an upper and lower surface. In this manner, items may be held on both the top panel 100 and bottom panel 300 easily and conveniently.

What is claimed is:

1. A portable workstation, comprising:
   a top panel having a distal edge and a lower surface;
   a bottom panel having a proximal edge and an upper surface;
   a middle panel hingedly connected to the distal edge and to the proximal edge;
   a series of tracks in the bottom panel, and a series of tracks in the middle panel;
   said middle panel and said bottom panel spanned by a first folding support, and said middle panel and said top panel spanned by a second folding support;
   wherein the first folding support engages a track on the bottom panel, and the second folding support engages a track on the middle panel;
   wherein the first folding support and the second folding support hold the top panel the bottom panel and the middle panel in one of several predetermined positions; and
   wherein the middle panel, the top panel, and the bottom panel form sides, a top, and a bottom of an enclosure when collapsed together.

2. The workstation of claim 1 wherein the first folding support is hingedly affixed to the lower surface.

3. The workstation of claim 1 wherein the second folding support is hingedly affixed to the connector.

4. The workstation of claim 1 further comprising multiple points of contact that engage the first folding support.

5. The workstation of claim 1 further comprising multiple points of contact that engage the second folding support.

6. The workstation of claim 1 further comprising a housing for the first folding support.

7. The workstation of claim 1 further comprising a housing for the second folding support.

8. The workstation of claim 1 wherein the top panel comprises a front holding bar adjacent and edge of the top panel distal from a opposing top panel edge coupled to the middle panel.

9. The workstation of claim 1 wherein the top panel comprises a rectilinear holding slot.

10. The workstation of claim 1 wherein the top panel comprises non-slip surface characteristics.

11. The workstation of claim 10 wherein the non-slip surface characteristics are rubberized strips.

12. The workstation of claim 1 further comprising a sliding tray in planar arrangement with the bottom panel adapted to slide out from the bottom panel.

13. The workstation of claim 12 wherein the sliding tray is comprises an aperture for holding an item therethrough.

14. The workstation of claim 1 wherein the bottom panel comprises an attachment mechanism for affixing the lower plate to an airline seatback tray table.

15. The workstation of claim 14 wherein the attachment mechanism comprises clips.

16. The workstation of claim 14 wherein the attachment mechanism comprises a resilient band.

17. A workstation assembly, comprising:
- a top panel, a bottom panel, and a middle panel in peripheral contour and hingedly coupled together in a Z configuration;
- first support members between the top panel and the middle panel;
- second support members between the middle panel and the bottom panel;
- the first support members and the second support members having a variety of settings for disposing the top panel, the middle panel, and the bottom panel in a variety of positions;
- the middle panel having a cut-out portion extending inward from an edge where the middle panel is hingedly coupled to the lower panel and forming an opening; and
- a slide in coplanar arrangement with the bottom panel, extendable from the bottom panel, and with the cut-out portion forming an enclosure when the workstation is collapsed.

18. The workstation of claim 17 wherein the slide covers the opening when the slide is closed.

19. The workstation of claim 17 wherein the slide further comprises an aperture for holding a cup.

\* \* \* \* \*